United States Patent
Eser et al.

(10) Patent No.: US 12,492,959 B2
(45) Date of Patent: Dec. 9, 2025

(54) METHOD FOR MONITORING AN OIL FLOW IN AN OIL COOLING CIRCUIT

(71) Applicant: Vitesco Technologies GmbH, Regensburg (DE)

(72) Inventors: Gerhard Eser, Munich (DE); Sebastian Brettner, Munich (DE); Manuel Dillinger, Munich (DE); Markus Feulner, Munich (DE); Hong Zhang, Munich (DE)

(73) Assignee: Vitesco Technologies GmbH, Regensburg (DE)

( * ) Notice: Subject to any disclaimer, the term of this patent is extended or adjusted under 35 U.S.C. 154(b) by 797 days.

(21) Appl. No.: 17/760,691

(22) PCT Filed: Sep. 4, 2020

(86) PCT No.: PCT/EP2020/074830
§ 371 (c)(1),
(2) Date: Mar. 15, 2022

(87) PCT Pub. No.: WO2021/052785
PCT Pub. Date: Mar. 25, 2021

(65) Prior Publication Data
US 2023/0037851 A1 Feb. 9, 2023

(30) Foreign Application Priority Data
Sep. 16, 2019 (DE) .................... 10 2019 214 080.7

(51) Int. Cl.
*G01L 27/00* (2006.01)
*H02K 9/19* (2006.01)
*H02K 11/20* (2016.01)

(52) U.S. Cl.
CPC .............. *G01L 27/007* (2013.01); *H02K 9/19* (2013.01); *H02K 11/20* (2016.01)

(58) Field of Classification Search
CPC ......... G01L 27/007; H02K 11/20; H02K 9/19
See application file for complete search history.

(56) References Cited

U.S. PATENT DOCUMENTS 6,323,613 B1 11/2001 Hara et al.
6,405,688 B1 6/2002 Dahm et al.
(Continued)

FOREIGN PATENT DOCUMENTS

CN 103389139 11/2013
CN 106525107 3/2017
(Continued)

OTHER PUBLICATIONS

Office Action dated Oct. 24, 2023, issued in Chinese Patent Application No. 20208005678.3.
(Continued)

*Primary Examiner* — Ricky Go
(74) *Attorney, Agent, or Firm* — COZEN O'CONNOR

(57) ABSTRACT

A method for monitoring an oil flow, generated by an oil pump, in an oil cooling circuit of a thermal management system, includes: arranging a first pressure sensor at a first point in the cooling circuit; arranging a second pressure sensor at a second point in the oil cooling circuit; determining pressure difference values based on recorded pressures; and comparing the pressure difference values with a predeterminable comparison value for the pressure difference so as to check for a fault.

13 Claims, 6 Drawing Sheets

(56) References Cited

U.S. PATENT DOCUMENTS

| | | | | |
|---|---|---|---|---|
| 2004/0216514 | A1* | 11/2004 | Nunnally | G01M 3/2815 |
| | | | | 73/40 |
| 2010/0281966 | A1* | 11/2010 | Cinpinski | F01L 1/245 |
| | | | | 73/114.25 |
| 2010/0295391 | A1 | 11/2010 | Perkins | |
| 2012/0043836 | A1 | 2/2012 | Creviston | |
| 2016/0178471 | A1* | 6/2016 | Blumrich | G01M 3/025 |
| | | | | 73/49.7 |
| 2018/0340409 | A1* | 11/2018 | Hassard | E21B 44/02 |
| 2019/0260272 | A1 | 8/2019 | Honjo | |

FOREIGN PATENT DOCUMENTS

| | | |
|---|---|---|
| CN | 107013673 | 8/2017 |
| DE | 101 55 387 | 5/2003 |
| DE | 102012200452 B3 | 5/2013 |
| DE | 102013226744 | 6/2015 |
| DE | 10 2017 006 366 | 1/2018 |
| DE | 10 2017 107 384 | 10/2018 |
| DE | 10 2018 002 072 | 10/2018 |
| EP | 0559993 | 9/1993 |
| EP | 1 323 986 | 7/2003 |
| EP | 2 871 424 | 5/2015 |
| EP | 3070279 | 9/2016 |
| EP | 2 392 486 | 4/2018 |
| JP | H 06-137126 | 5/1994 |
| JP | 2017-121818 | 7/2017 |
| RU | 182694 | 8/2018 |
| WO | WO 2017/214234 | 12/2017 |
| WO | WO 2018/064054 | 4/2018 |

OTHER PUBLICATIONS

International Search Report issued in corresponding PCT Application PCT/EP2020/074830.

Written Opinion issued in corresponding PCT Application PCT/EP2020/074830.

Office Action issued in corresponding German Application No. 10 2019 214 080.7.

STS Sensoren Transmitter Systeme GmbH / Grundlagen der Durchflussmessung Jan. 2, 2018.

Notice of Allowance of Corresponding Chinese Patent Application No. 202080056784.3 dated Sep. 13, 2024.

* cited by examiner

METHOD FOR MONITORING AN OIL FLOW IN AN OIL COOLING CIRCUIT

CROSS REFERENCE TO RELATED APPLICATIONS

This is a U.S. national stage of International application No. PCT/EP2020/074830, filed on Sep. 4, 2020, which claims priority to German Application No. 10 2019 214 080.7 filed Sep. 16, 2019, the content of each of which is incorporated herein by reference.

BACKGROUND OF THE INVENTION

1. Field of the Invention

The invention relates to a method for monitoring an oil flow, generated by an oil pump, in an oil cooling circuit of a thermal management system.

A vehicle is to be understood here as any type of vehicle comprising a battery and an electric motor, the temperature of both of which is to be controlled, for driving the vehicle. The battery may in this case be air-cooled and/or coolant-cooled or water-cooled. The electric motor, on the other hand, may in this case either only be oil-cooled or both coolant-cooled or water-cooled and oil-cooled. This may be a partially electric or fully electric vehicle, but in particular passenger cars and/or utility vehicles.

2. Description of the Prior Art

EP 2392486 B1 discloses a thermal management system having a first coolant circuit for controlling the temperature of a battery and a second coolant circuit for controlling the temperature of an electric motor and a power electronics system.

SUMMARY OF THE INVENTION

It is an object of the invention to improve such a thermal management system.

This object may be achieved by a method for monitoring an oil flow, generated by an oil pump, in an oil cooling circuit of a thermal management system, the oil cooling circuit comprising an electric motor, is proposed. A first pressure sensor is arranged at a first point and a second pressure sensor is arranged at a second point in the oil cooling circuit, wherein pressure difference values are determined by recorded pressures and the pressure difference values are compared with a predeterminable comparison value for the pressure difference in order to check for a fault.

Owing to this proposed sensor redundancy, the recorded pressures or measured pressure values can be checked for plausibility.

In one embodiment, the oil flow is monitored:
in a pressure build-up phase (phase I),
in an operating phase (phase II)
and/or
in a pressure reduction phase (phase III).

In this case, at least one pressure difference value is determined in the individual phases and the pressure difference value is compared with a predeterminable, phase-related comparison value for the pressure difference in order to check for a fault.

In a further aspect, even before the oil pump is activated by way of the pressure difference value determination, an electrical fault in the pressure sensors is checked by virtue of the determined pressure difference value being compared with a predeterminable first pressure comparison value.

In a further aspect, after the oil pump has been activated during the pressure build-up phase (phase I), a pressure difference value is determined at least for one pressure stroke of the oil pump and the pressure difference value is compared with a predeterminable second pressure comparison value in order to check for a fault in the pressure build-up phase (phase I).

The time until the pressure stroke is reached may also be compared with a predeterminable time comparison value in order to check for a fault in the pressure build-up phase (phase I).

In a further aspect, during the operating phase (phase II), at least one pressure difference value is determined and compared with a predeterminable third pressure comparison value in order to check for an electrical fault in the pressure sensors.

An average value is then formed by the recorded pressures and the average value is compared with a predeterminable fourth pressure comparison value in order to check for a fault in the operating phase (phase II).

In a further aspect, after the oil pump is deactivated, during the pressure reduction phase (phase III), at least one pressure difference value is determined and the pressure difference value is compared with a predeterminable fifth pressure comparison value in order to check for an electrical fault in the pressure sensors.

After a predeterminable debounce time with respect to the deactivation, the recorded pressures are also compared with a predeterminable pressure target value related to the debounce time in order to check for a fault in the pressure reduction phase (phase III).

In one aspect, the electric motor is purely oil-cooled. In this case, the oil cooling circuit is thermally connected via a heat exchanger, for example in the form of a plate heat exchanger, to a coolant circuit, which may include, for example, a power electronics system for the electric motor and a battery charging device.

In a further aspect, the stator of the electric motor is encompassed by a coolant circuit and is therefore coolant-cooled, whereas the rotor of the electric motor is encompassed by an oil cooling circuit and is therefore oil-cooled. In this case, the oil cooling circuit is used for additional cooling of the electric motor, wherein the oil cooling circuit is thermally connected to the coolant circuit via a heat exchanger, for example in the form of a plate heat exchanger.

In a further embodiment, the two pressure sensors are arranged upstream of a heat exchanger, for example in the form of a plate heat exchanger, and downstream of the oil pump.

A computer program for carrying out the method described above is also proposed.

The computer program can in this case be read into control electronics or a controller and then used to monitor the oil cooling circuit accordingly.

The control electronics system here can have a digital microprocessor (CPU) connected in terms of data to a storage system and to a bus system, a random access memory (RAM) and also a storage. The CPU is configured to execute commands, which are embodied as a program stored in a storage system, to detect input signals from the data bus and to output output signals to the data bus. The storage system can have various storage media in the form of magnetic, solid-state and other non-volatile media on which a corresponding computer program for carrying out the method and the advantageous configurations is stored.

The program can be configured in such a way that it embodies or is able to execute the methods described here such that the CPU can execute the steps of such methods and thus monitor the oil cooling circuit accordingly.

In addition, a computer program product is proposed, comprising program code which are stored on a computer-readable data storage medium in order to carry out the method described above when the program code are executed on a computer or in a CPU.

A controller having a computer program for carrying out the method described above is also proposed.

A vehicle having such a controller is also proposed.

BRIEF DESCRIPTION OF THE DRAWINGS

The invention will be explained below in detail with reference to illustrations in figures. Further advantageous refinements of the invention emerge from the description below of preferred embodiments. In this respect.

DETAILED DESCRIPTION OF THE PRESENTLY PREFERRED EMBODIMENTS

Figure 1:
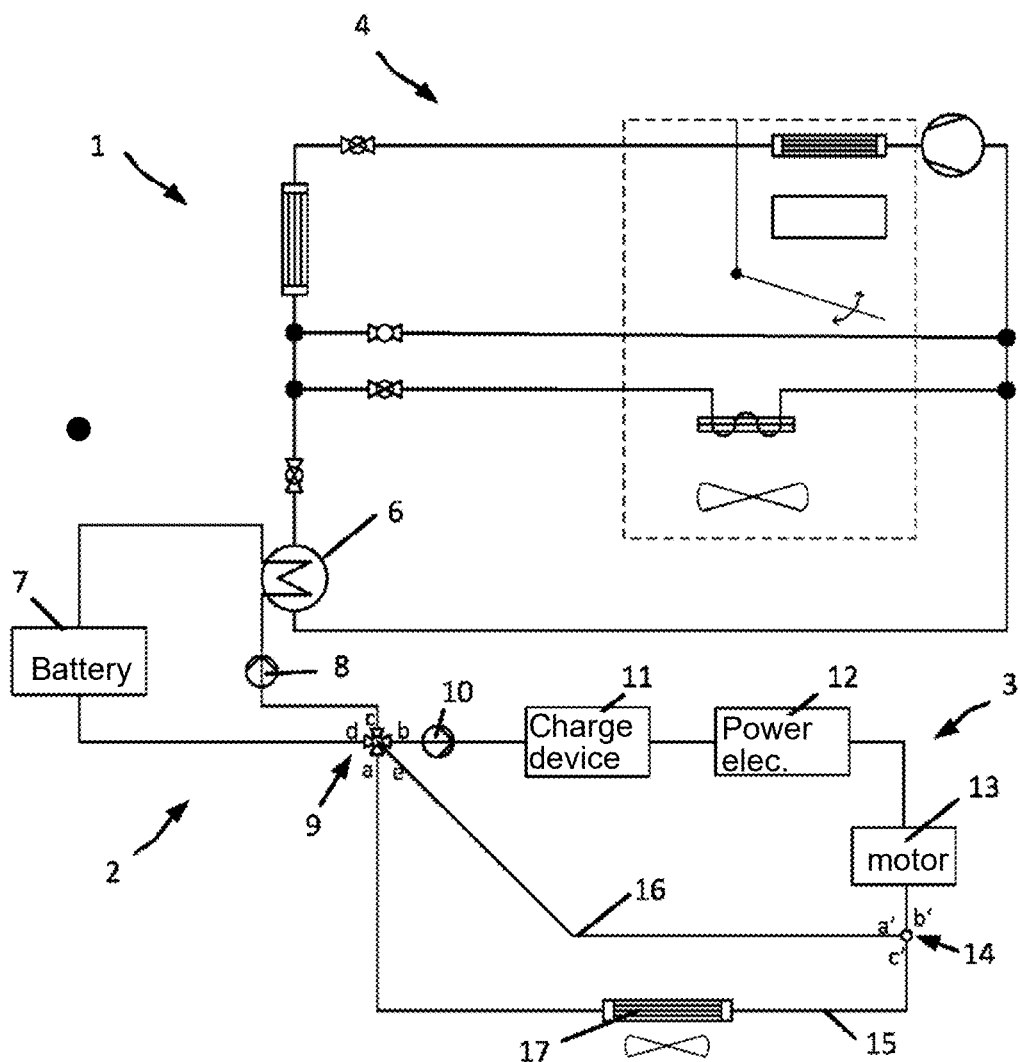
FIG. 1 shows a thermal management system in a proposed first configuration.

The thermal management system 1 of a vehicle according to FIG. 1 illustrates a first coolant circuit 2 for a battery 7 and a second coolant circuit 3 for an electric motor 13 for driving the vehicle, as well as a refrigerant circuit 4 of an air conditioning system, which is not dealt with in any more detail below, however. The vehicle may in this case be, for example, a battery electric vehicle (for short: BEV), a hybrid electric vehicle (for short: HEV) or a fuel cell vehicle (for short: FCEV). These three cooling circuits 2, 3, 4 merge to a certain extent with one another. The respective coolant is conveyed in the two coolant circuits 2, 3 by a dedicated electric pump 8, 10.

Such a coolant is to be understood in this case as a mixture of water with a coolant additive. The task of the coolant here is not only to absorb and transport waste heat. The cooling additive is intended here to protect the water from freezing through, to protect the two coolant circuits from corrosion, to lubricate the moving parts in the two coolant circuits and also to protect plastic and/or rubber elements in the two coolant circuits from dissolving.

The electric motor 13 and a power electronics system 12 should be operated at a coolant or cooling water temperature of approximately 80 to a maximum of 85° C. In this case, the coolant has a temperature of approximately 55° C. at the inlet to the power electronics system 12 and a temperature of approximately 65° C. at the inlet to the electric motor 13. At the outlet of the electric motor 13, the cooling liquid then has a temperature of approximately 80 to a maximum of 85° C.

The battery 7 or the battery cells, in contrast, should be operated in a coolant or cooling water temperature window between approximately 20° C. and approximately 40° C. because this ensures an optimal operating temperature range for the battery 7. The temperature of the battery 7 or of the individual battery cells themselves can in this case definitely exceed the temperature threshold of approximately 40° C. The two coolant circuits 2, 3 have to be able to both absorb and dissipate heat. While the battery coolant circuit 2 is cooled with respect to the refrigerant circuit 4 via a heat exchanger 6 (also called a chiller; cf. FIG. 1), the electric motor coolant circuit 3 can be cooled with respect to the environment via a radiator or cooler 17 as well as with respect to the battery coolant circuit 2 via a multi-way valve 9 (also referred to as coolant flow control valve, for short: CFCV), which is described below, wherein the multi-way valve 9 constitutes an interface between the battery coolant circuit 2 and the electric motor coolant circuit 3 and which assumes a corresponding valve position so that the coolant flows of the two coolant circuits 2, 3 can mix with one another as required.

The battery coolant circuit 2 can also be cooled via the radiator or cooler 17 in an appropriate valve position of the multi-way valve 9. However, since the battery coolant should not exceed a temperature of 40° C., the cooling via the radiator 17 is usually insufficient, and therefore heat has to be dissipated via the heat exchanger 6. In addition to the electric motor 13 and the power electronics system 12, a charging device 11 (also referred to as charger) is also to be cooled in the electric motor coolant circuit 3. To control the coolant circuits 2, 3, a respective temperature sensor (not illustrated) is provided. A resistance heater (not illustrated) is also provided in the battery coolant circuit 2 in order to be able to supply electrical heat for a short time.

The thermal management system 1 can be operated in different modes by the multi-way valve 9. The multi-way valve 9 here is part of what is referred to as an actuator, also referred to as cooling water control valve, which as such also comprises a drive with an electric servomotor and a control for controlling the electric servomotor.

With regard to these modes, for the sake of completeness, reference is made to the German patent application with the file number 10 2019 210 577.7, which goes into this in detail.

In a first mode of the system (Use Case 1, for short: UC1=series connection R with maximum heat recovery) and in a first valve position of the multi-way valve 9, the coolant circuit 2 can be connected in series with the coolant circuit 3. In this case, with respect to the multi-way valve 9, coolant flows via an inflow or inlet a and an outflow or outlet c from the coolant circuit 3 into the coolant circuit 2 and finally via an inflow or inlet d and an outflow or outlet b from the coolant circuit 2 back into the coolant circuit 3.

This series connection causes the battery coolant circuit 2 to heat rapidly, utilizing the waste heat from the electric motor 13 and the power electronics system 12. The electric motor coolant circuit 3 thus also has the function of a heating circuit.

In a second mode of the system (Use Case 2, for short: UC2=parallel connection P with overheating protection) and in a second valve position of the multi-way valve 9, the coolant circuit 2 can be connected parallel to the coolant circuit 3, such that the two coolant circuits 2, 3 are fluidically separated from each other. This separation protects the battery 7 from overheating.

In addition, a third mode of the system (Use Case 3, for short: UC3=mixing mode M with selective heat recovery) is also proposed, in which the multi-way valve 9 is switched to an intermediate position—that is to say a third valve position—in which the coolant flows of the two coolant circuits 2, 3 are mixed with each other as needed.

Such a mixing mode allows both the coolant temperature of the battery coolant circuit 2 and the coolant temperature of the electric motor coolant circuit 13 to be controlled more precisely. In this case, there are advantageously no high pressure and temperature jumps in the two coolant circuits 2, 3, since there is no frequent switching between the series connection mode R and the parallel connection mode P.

In the embodiment proposed here (cf. for example FIG. 1), the multi-way valve 9 is configured in the form of a 5/3-way valve. An inlet or input e of the 5/3-way valve that protrudes from the plane in FIG. 1 should also be imagined here, which inlet or input as such is fluidically connected via a bypass path 16 to a junction 14 (or the outlet a1 thereof) downstream of the electric motor 13, wherein both the bypass path 16 and a path 15 parallel thereto with a radiator 17 originate from the junction 14. The radiator path 15 fluidically connects the junction 14 (or the outlet c1 thereof) to the inlet or input a of the 5/3-way valve.

Instead of the 5/3-way valve, it is also possible to use a multi-way valve in the form of a 4/2-way valve, via which the previously described system modes and valve positions can likewise be set or controlled. A further multi-way valve in the form of a 3/2-way valve, which is fluidically connected to the inflow or input a of the 4/2-way valve, is to be provided here in the coolant circuit 3 downstream of the electric motor 13—instead of the aforementioned junction.

With regard to this alternative configuration, for the sake of completeness, reference is likewise made to the German patent application with the file number 10 2019 210 577.7, which goes into this in detail.

Figure 2:
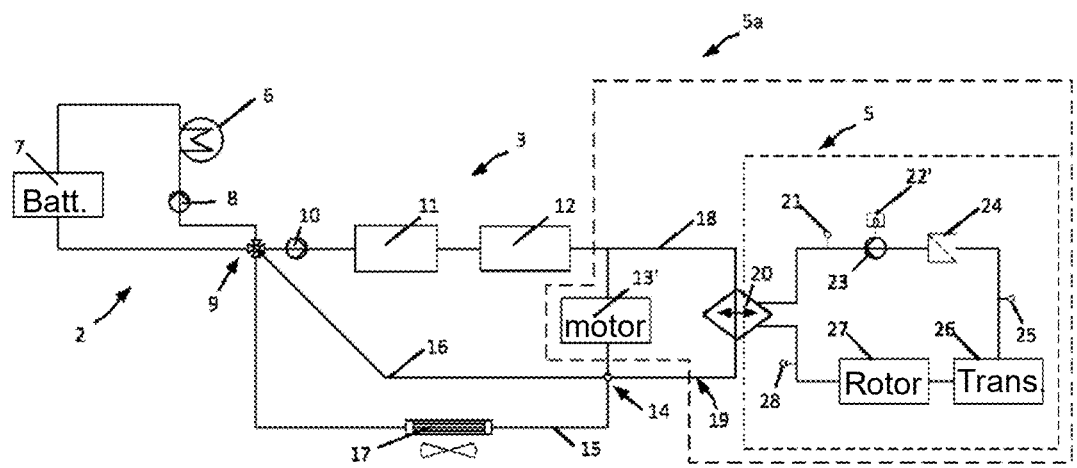
FIG. 2 shows the thermal management system shown in FIG. 1 in connection with an oil cooling circuit in a first configuration.

The thermal management system 1 further comprises an oil cooling system 5a having an oil cooling circuit 5 (cf. FIG. 2, FIG. 3, FIG. 4) for additional cooling of the electric motor 13. The oil cooling circuit 5 is thermally connected here to the coolant circuit 3 by a heat exchanger 20. In addition to a part of the heat exchanger 20, the oil cooling circuit 5 comprises the rotor 27 of the electric motor 13 and a gear or reduction and/or transmission gear 26, for example in the form of a three-stage gear, which together with the electric motor 13 (or stator 13I and rotor 27) forms an electric motor-gear drive. The oil cooling circuit 5 further comprises an oil pump 23, an oil filter 24 fluidically connected upstream of the oil pump 23 and two temperature sensors 25, 28 (cf. FIG. 2, FIG. 3, FIG. 4).

In contrast, the stator 13I of the electric motor 13 is encompassed by the coolant circuit 3, that is to say that the stator 13I is coolant-cooled or water-cooled.

The waste heat from the electric motor 13 or stator 13I and rotor 27 absorbed by the oil cooling circuit 5 is fed to the coolant circuit 3 via the heat exchanger 20. In this case, the heat exchanger 20 is arranged fluidically in parallel with the coolant-cooled or water-cooled stator 13I.

A first feed line 18 in this case leads from a junction of the coolant circuit 3 upstream of the stator 13I to the heat exchanger 20 and a second feed line 19 leads from the heat exchanger 20 to the junction 14 downstream of the stator 13I.

An oil, which is also used for lubricating and cooling the transmission 26, is conveyed through a shaft of the rotor 27 to at least one outlet point of the rotor 27. From this outlet point, the oil is forced against the windings of the stator 13I as a result of centrifugal force, with the oil being distributed over the rotor 27 and in this case also reaching the two bearing points of the rotor shaft. The oil finally flows into an oil pan fixed to the stator 13I and by which it is held. The oil pump 23 sucks in the oil from the oil pan and conveys it.

Here, the oil cools the electric motor 13 in addition to the coolant of the electric motor coolant circuit by absorbing the waste heat from the stator 13I and rotor 27 and at the same time lubricating the bearing points of the rotor shaft.

Figure 3:
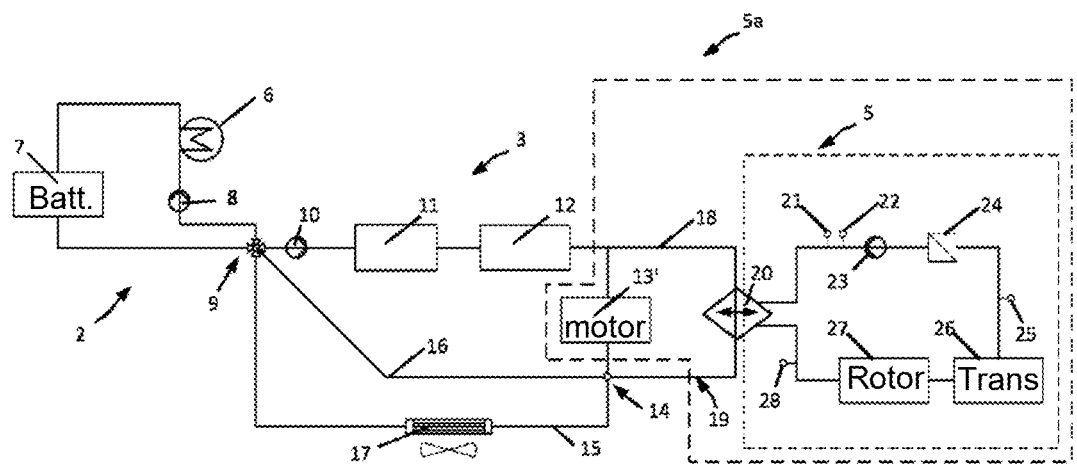
FIG. 3 shows the thermal management system shown in FIG. 1 in connection with an oil cooling circuit in a second configuration.
Figure 4:
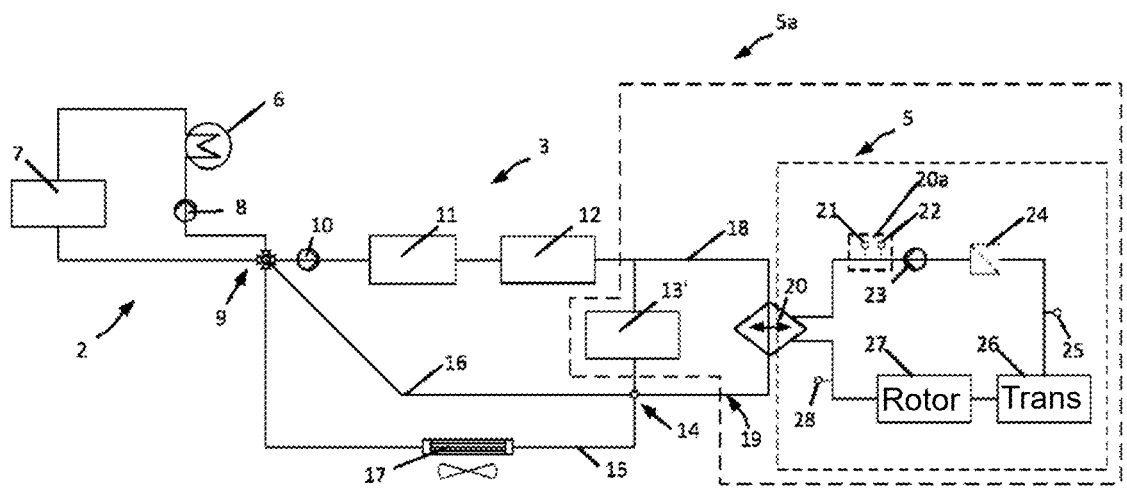
FIG. 4 shows the thermal management system shown in FIG. 1 in connection with an oil cooling circuit in a third configuration.

The oil cooling circuit 5 also comprises a monitoring system for monitoring the oil flow. The monitoring system preferably comprises in this case a pressure sensor 21 upstream of the heat exchanger 20 and downstream of the oil pump 23. In a first embodiment, the monitoring system further comprises a speed sensor 221, which is arranged on the oil pump 23 for detecting a pump speed (cf. FIG. 2). In a second embodiment, instead of the speed sensor 221, an additional pressure sensor 22 is advantageously proposed in order to be able to determine pressure differences by detected pressures. By using the two pressure sensors 21, 22, the costs of such a monitoring system can be reduced significantly. It is proposed here to arrange the two pressure sensors 21, 22 preferably upstream of the heat exchanger 20 and downstream of the oil pump 23. In FIG. 3, in contrast to FIG. 2, the two pressure sensors 21, 22 are an integral part of a sensor module 20a.

Figure 5:
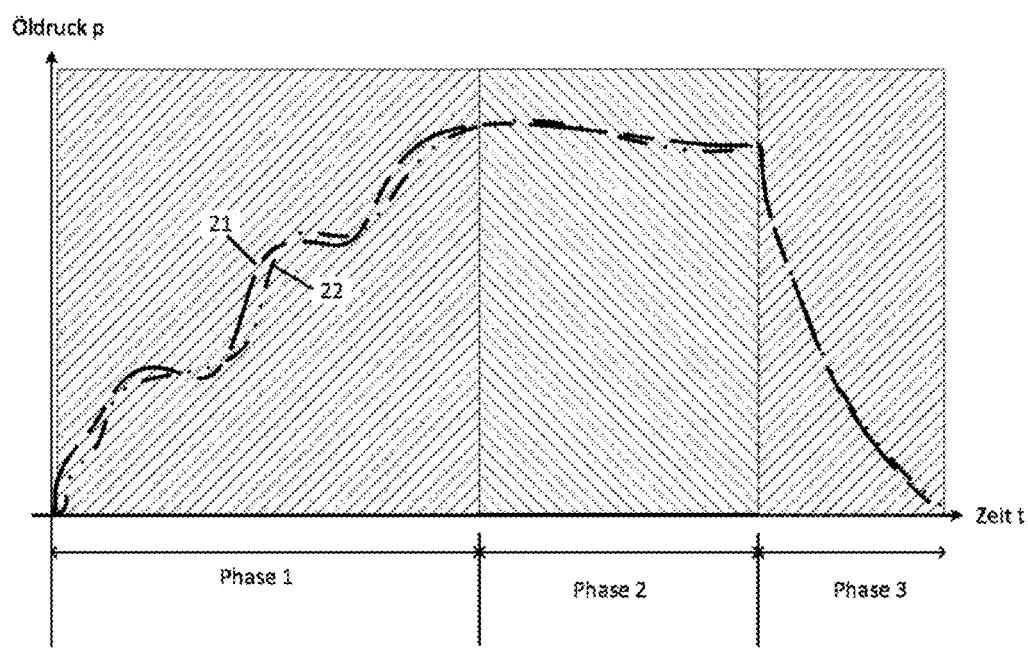
FIG. 5 shows oil pressure curves corresponding to different phases of the oil cooling circuit.

FIG. 5 illustrates the pressure curves, which are detected by the two pressure sensors 21, 22, corresponding to the oil flow in the oil cooling circuit 5 in three successive phases, namely:

in a pressure build-up phase (phase I), in an operating phase (phase II), which follows the pressure build-up phase, and in a pressure reduction phase (phase III), which follows the operating phase.

In order to monitor the oil flow, pressure difference values are determined here between the two pressure curves with regard to the individual phases I to III. These pressure difference values are then compared with a predeterminable and phase-related comparison value—also referred to as a threshold value or reference value—for the pressure difference in order to check for an error, with an error being identified if the comparison value is exceeded.

Figure 6:
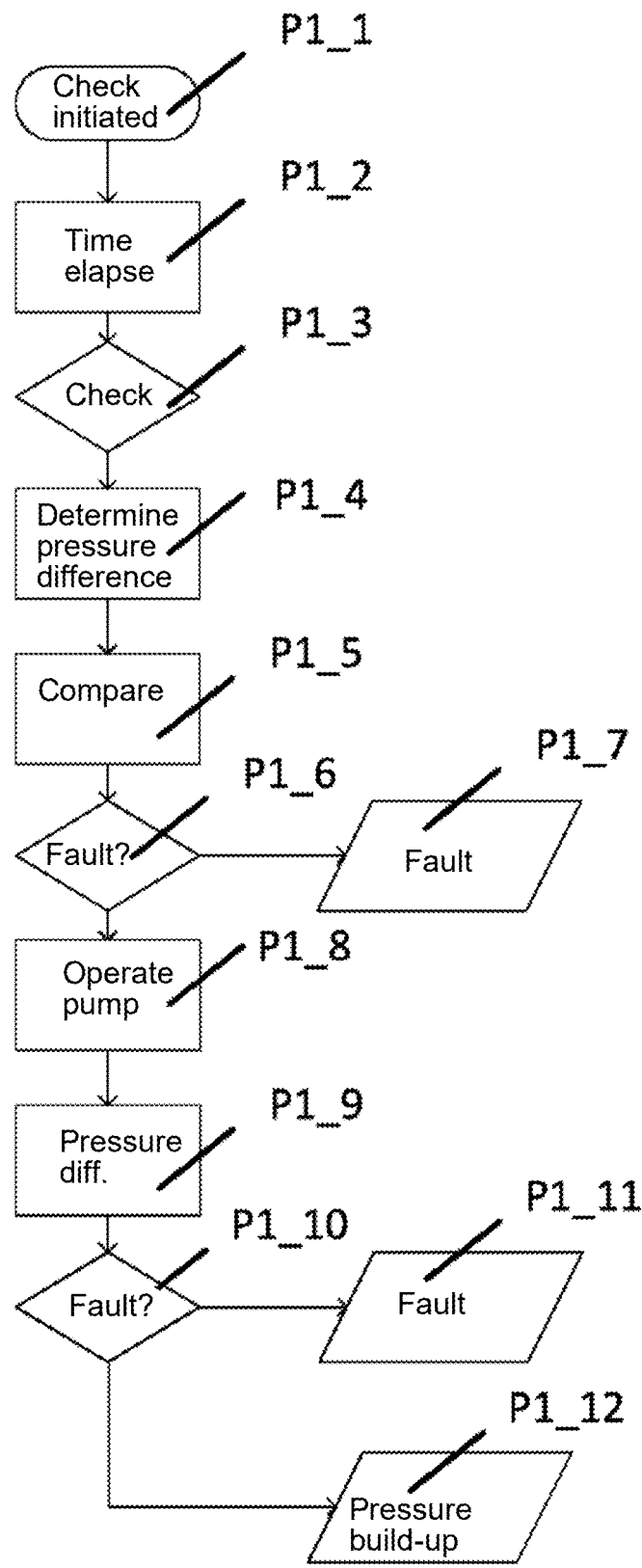
FIG. 6 shows a first flowchart corresponding to a proposed monitoring of the oil cooling circuit in a pressure build-up phase.

Even before the oil pump 23 and thus the oil cooling circuit 5 is put into operation or activated, that is to say before the pressure build-up phase (phase I) is initiated, it is proposed to check for an electrical fault in the monitoring system (or sensor fault), that is to say, for example, a short circuit or cable break (cf. in this respect steps P1_1 to P1_7 in FIG. 6).

For this purpose, a minimum time or debounce time is allowed to elapse (cf. step P1_2, FIG. 6) from the time this check is initiated (cf. step P1_1, FIG. 6) in order to ensure that the oil cooling circuit 5 is idle and the pressure within the oil cooling circuit 5 is reduced. This condition is checked in step P1_3. The signals from the pressure sensors 21, 22 are then discretely recorded at at least one point in time and a pressure difference value is determined for this point in time (cf. step P1_4, FIG. 6). This pressure difference value is then compared in step P1_5 with a predeterminable, first pressure comparison value SW1. If the pressure difference value exceeds the pressure threshold value SW1 in step P1_6, an electrical fault of this type in the monitoring system (or sensor fault) is identified (cf. step P1_7, FIG. 6). Otherwise, there is a fault-free monitoring system.

In step P1_8, the oil pump 23 and thus the oil cooling circuit 5 are put into operation or activated, as a result of which the pressure build-up phase (phase I) is initiated. The signals of the pressure sensors 21, 22 for at least one pressure stroke of the oil pump 23—which is a positive displacement pump—are recorded here discretely (cf. step P1_8, FIG. 6). Such a pressure stroke during the pressure build-up phase (phase I) can be clearly seen in FIG. 5. Then at least one pressure difference value is determined (cf. step P1_8, FIG. 6) and the pressure difference value is then compared with a predeterminable, second pressure comparison value SW2 (phase-related comparison value for the pressure difference) (cf. step P1_9, FIG. 6). In addition to this, the time until the pressure stroke is reached can also be compared with a predeterminable time comparison value.

In the event that the determined pressure difference value on the one hand and possibly also the determined time value on the other hand exceed the respectively assigned comparison value (cf. step P1_10, FIG. 6), such a fault is identified (cf. fault output in step P1_11, FIG. 6) in the pressure build-up phase (phase I). Otherwise, there is a fault-free pressure build-up phase (phase I) (cf. step P1_12, FIG. 6).

Figure 7:
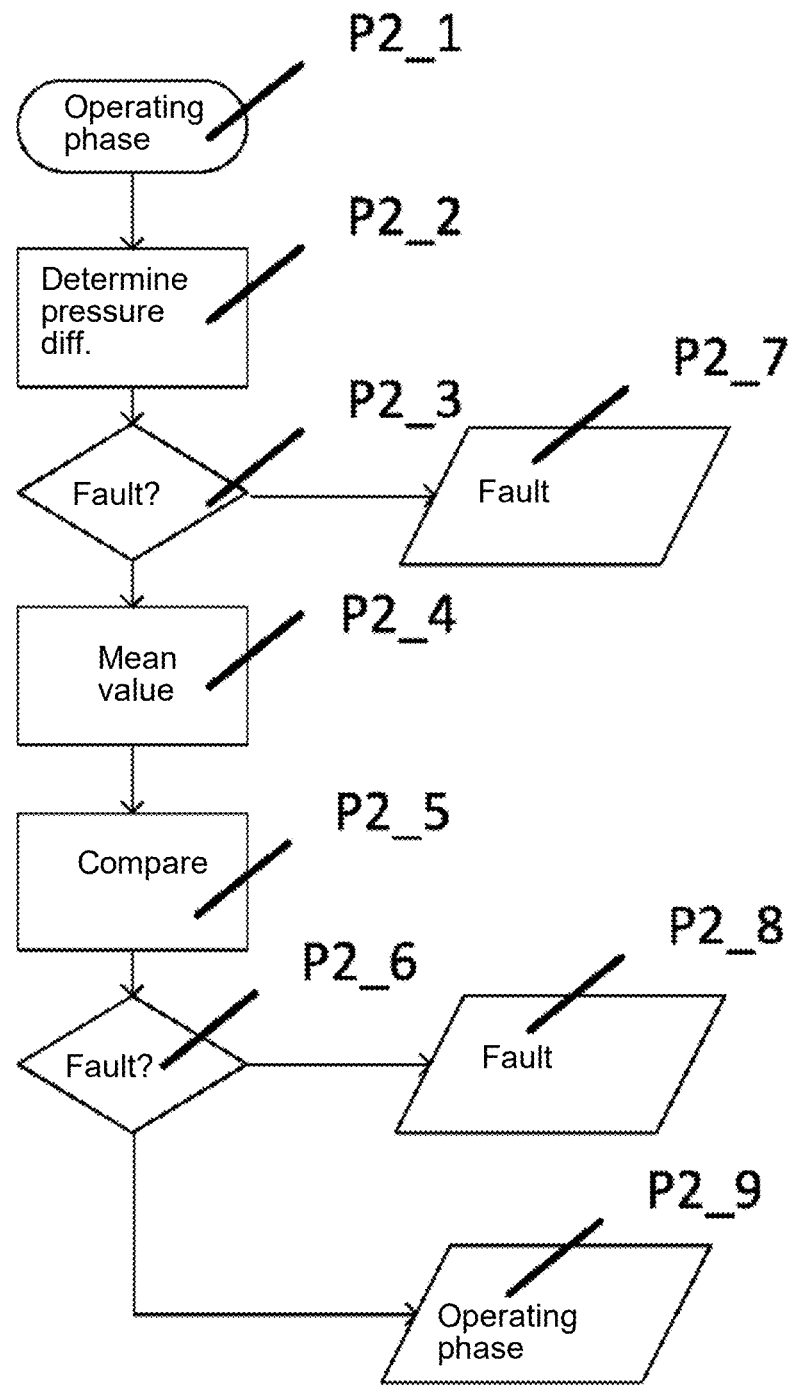
FIG. 7 shows a second flowchart corresponding to a proposed monitoring of the oil cooling circuit in an operating phase.

After initiation of the operating phase (phase II; cf. step P2_1, FIG. 7), which follows the pressure build-up phase (phase I), the signals of the pressure sensors 21, 22 are again detected discretely, that is to say at at least one point in time and for this point in time a pressure difference value is determined from the two sensor signals (cf. step P2_2, FIG. 7). This pressure difference value is then compared with a predeterminable third pressure comparison value SW3 (phase-related comparison value for the pressure difference) (cf. also step P2_2, FIG. 7) in order to check for an electrical fault in the monitoring system (or sensor fault). If the determined pressure difference value exceeds the pressure comparison value SW3 (cf. step P2_3, FIG. 7), an electrical fault of this type in the monitoring system (or sensor fault) is identified (cf. step P2_7, FIG. 7).

Subsequently, a mean value is formed from the discretely recorded signals of the two pressure sensors 21, 22 (cf. step P2_4, FIG. 7) and this mean value or pressure mean value is then compared (cf. step P2_5, FIG. 7) with a predeterminable fourth pressure comparison value (phase-related comparison value for the pressure difference) in order to check for a fault in the operating phase (phase II). If this mean pressure value exceeds the comparison value in step P2_6, then such a fault is identified (cf. step P2_8, FIG. 7) in the operating phase (phase II). Otherwise, there is a fault-free operating phase (phase II) (cf. step P2_9, FIG. 7).

Figure 8:
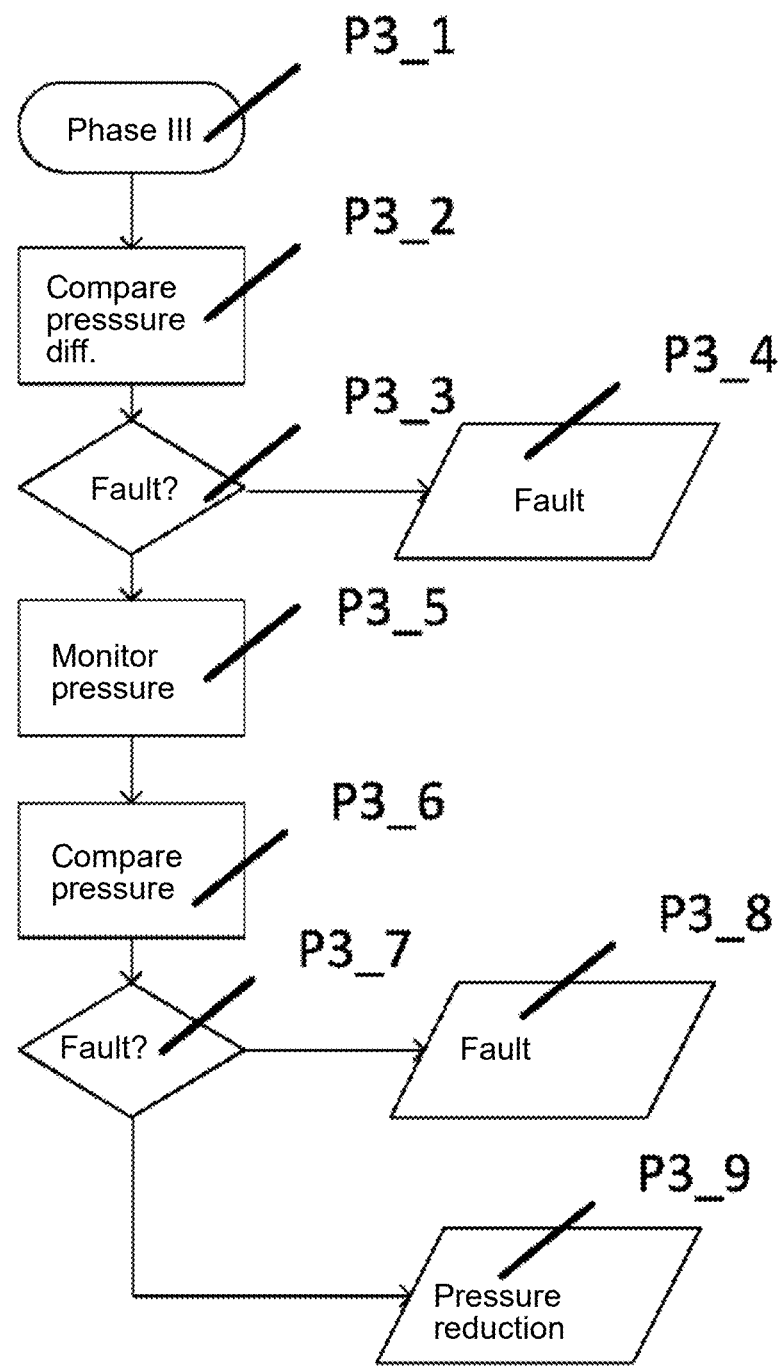
FIG. 8 shows a third flowchart corresponding to a proposed monitoring of the oil cooling circuit in a pressure reduction phase.

After the oil pump 23 used to initiate the pressure reduction phase (phase III) has been deactivated or taken out of operation (cf. step P3_1, FIG. 8), the signals from the pressure sensors 21, 22 are again discretely recorded at at least one point in time (cf. step P3_2, FIG. 8). A pressure difference value is then determined for this point in time and this pressure difference value is then compared (cf. also step P3_2, FIG. 8) with a predeterminable fifth pressure comparison value SW5 (phase-related comparison value for the pressure difference) in order to check for an electrical fault in the monitoring system (or sensor fault). If this pressure difference value exceeds the pressure comparison value in step P3_3, an electrical fault of this type in the monitoring system (or sensor fault) is identified (cf. step P3_4, FIG. 8). Otherwise, there is a fault-free monitoring system.

A pressure reduction is then monitored by comparing, after a predeterminable time or debounce time (cf. step P3_5, FIG. 8) with respect to the initiation of the pressure reduction phase (phase III), the two discretely recorded pressures or pressure sensor values with a predeterminable target value related to the debounce time (sixth pressure comparison value SW6; phase-related comparison value for the pressure difference) in order to check for a fault in the pressure reduction phase (phase III). If this target value is exceeded (cf. step P3_7, FIG. 8), such a fault is identified (cf. step P3_8, FIG. 8) in the pressure reduction phase (phase III). Otherwise, there is a fault-free pressure reduction phase (phase III) (cf. step P3_9, FIG. 8).

With regard to the individual phases I, II, III, it is proposed that the pressure sensor values be recorded every 10 to 100 ms, for example. The previously mentioned phase-related comparison values can vary here in a phase-related manner, that is to say can be phase-specific.

Although exemplary embodiments are explained in the above description, it should be noted that numerous modifications are possible. It should moreover be pointed out that the exemplary embodiments are merely examples which are not intended to limit the scope of protection, the applications and the structure in any way. Instead, the above description gives a person skilled in the art a guideline for the implementation of at least one exemplary embodiment, wherein various changes may be made, especially with regard to the function and arrangement of the integral parts described, without departing from the scope of protection as it is apparent from the claims and combinations of features equivalent thereto.

The invention claimed is:

1. A method for monitoring an oil flow, generated by an oil pump (23), in an oil cooling circuit (5) of a thermal management system (1), the method comprising:
    arranging a first pressure sensor (21) at a first point in the cooling circuit (5);
    arranging a second pressure sensor (22) at a second point in the oil cooling circuit (5),
    wherein the first pressure sensor (21) and/or the second pressure sensor (22) comprise a monitoring system;
    determining pressure difference values based on recorded pressures;
    comparing the pressure difference values with a predeterminable comparison value for the pressure difference so as to check for a fault in the first pressure sensor (21) and/or the second pressure sensor (22);
    one of operating the oil pump in a monitoring system no-fault condition and not operating the oil pump in a fault condition;
    monitoring the oil flow in a pressure reduction phase (phase III);
    after the oil pump (23) is deactivated, determining at least one pressure difference value and comparing the pressure difference value with a predeterminable pressure comparison value; and
    comparing, after a pre-determinable debounce time, the recorded pressures with a predeterminable pressure target value related to the debounce time to check for a fault in the pressure reduction phase (phase III).

2. The method as claimed in claim 1, further comprising:
    monitoring the oil flow:
        in a pressure build-up phase (phase I), and/or
        in an operating phase (phase II), determining at least one of the pressure difference values in respective phases; and comparing the pressure difference value with a predeterminable, phase-related comparison value for the pressure difference so as to check for a fault.

3. The method as claimed in claim 2, further comprising:
before the oil pump (23) is activated by way of the pressure difference values determining, checking for an electrical fault in the pressure sensors (21, 22) by comparing the determined pressure difference values with a predeterminable first pressure comparison value (SW1).

4. The method as claimed in claim 3, further comprising: after the oil pump (23) has been activated during the pressure build-up phase (phase I), determining a pressure difference value at least for one pressure stroke of the oil pump (23) and comparing the pressure difference value is compared with a predeterminable second pressure comparison value (SW2) so as to check for a fault in the pressure build-up phase (phase I).

5. The method as claimed in claim 4, further comprising:
comparing the time until the pressure stroke is reached with a pre-determinable time comparison value so as to check for a fault in the pressure build-up phase (phase I).

6. The method as claimed in claim 5, further comprising:
during the operating phase (phase II), determining at least one pressure difference value and comparing the determined at least one pressure difference with a predeterminable third pressure comparison value (SW3) so as to check for an electrical fault in the pressure sensors (21, 22).

7. The method as claimed in claim 6, further comprising: determining an average value of the recorded pressures; and comparing the average value with a predeterminable fourth pressure comparison value (SW4) so as to check for a fault in the operating phase (phase II).

8. The method as claimed in claim 1,
wherein during the pressure reduction phase (phase III), the predeterminable pressure is a predeterminable fifth pressure comparison value (SW5).

9. The method as claimed in claim 1, wherein the oil cooling circuit (5) is configured to cool an electric motor (13), by being thermally connected to a coolant circuit (3) via a heat exchanger (20).

10. The method as claimed in claim 1, wherein the first and second pressure sensors (21, 22) are each arranged upstream of a heat exchanger (20) and downstream of the oil pump (23).

11. A non-transitory computer-readable data storage medium storing a computer program, comprising program code which, when executed on a processor of a processor controlled apparatus, causes the apparatus to perform the method as claimed in claim 1.

12. A control device having a computer program for carrying out the method as claimed in claim 1.

13. A vehicle having the control device as claimed in claim 12.

* * * * *